United States Patent [19]

Bayley

[11] 4,190,810
[45] Feb. 26, 1980

[54] GAS LASER WITH RESISTIVE STRIP ARRANGEMENT FOR STARTING ENHANCEMENT

[75] Inventor: Allan E. Bayley, Carlsbad, Calif.
[73] Assignee: Hughes Aircraft Company, Culver City, Calif.
[21] Appl. No.: 901,879
[22] Filed: May 1, 1978
[51] Int. Cl.² .............................................. H01S 3/097
[52] U.S. Cl. ......................... 331/94.5 PE; 331/94.5 D
[58] Field of Search ................. 331/94.5 G, 94.5 PE, 331/94.5 D; 330/4.3

[56] References Cited
U.S. PATENT DOCUMENTS

| | | | |
|---|---|---|---|
| 3,688,217 | 8/1972 | Witte et al. | 331/94.5 PE |
| 3,792,372 | 2/1974 | Mark | 331/94.5 PE |
| 4,010,397 | 3/1977 | Hon | 331/94.5 PE |
| 4,065,370 | 12/1977 | Noble et al. | 331/94.5 PE |

Primary Examiner—William L. Sikes
Attorney, Agent, or Firm—Paul M. Coble; W. H. MacAllister

[57] ABSTRACT

The disclosed arrangement for enhancing the starting characteristics of a cold cathode gas laser includes a strip of electrically conductive plastic disposed on the outer lateral surface of the laser tube. The strip extends longitudinally along the tube for most of the length of the tube and extends circumferentially about the tube in the vicinity of its end remote from the laser anode. A tape of electrically insulating material overlies the strip and adhesively holds it against the laser tube. The end of the strip remote from its circumferentially extending portion is electrically connected to the anode. Faster starting with relatively low voltages and with a more uniform voltage magnitude and turn-on time delay for individual laser tubes are achieved.

7 Claims, 3 Drawing Figures

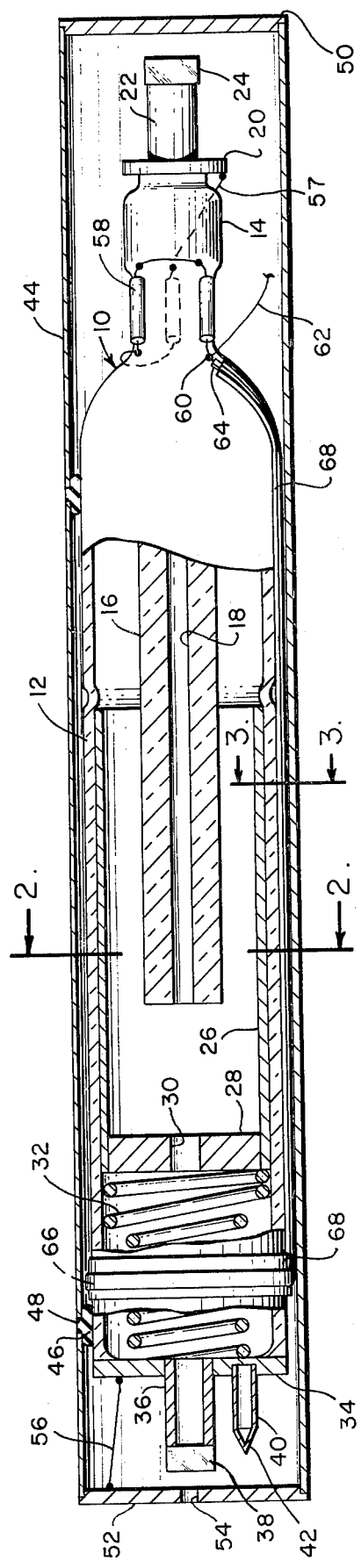
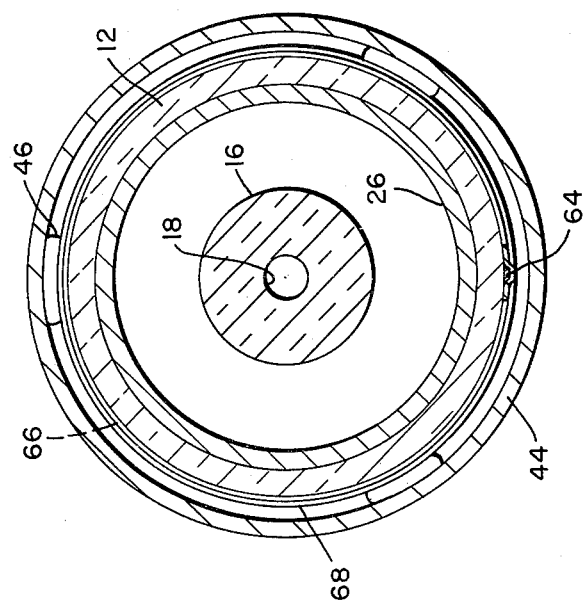
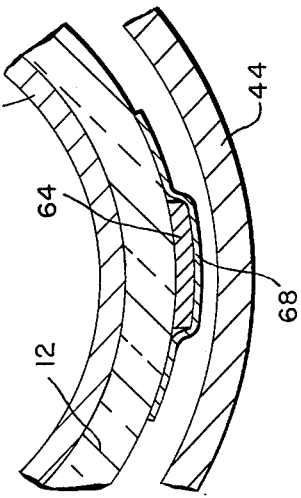

GAS LASER WITH RESISTIVE STRIP ARRANGEMENT FOR STARTING ENHANCEMENT

BACKGROUND OF THE INVENTION

1. Field of the Invention

This invention relates to lasers, and more particularly, it relates to an arrangement for enhancing the starting characteristics of cold cathode gas lasers, particularly in the dark environment of a protective housing.

2. Description of the Prior Art Including Prior Art Statement

A common technique for pumping the laser medium of a cold cathode gas laser involves establishing an electrical discharge between the anode and cathode of the laser tube. Conventionally, such discharges are both initiated and maintained by application of a voltage of sufficient magnitude between the anode and the cathode. The applied voltage first produces breakdown of the laser gas to initiate the discharge, after which the magnitude of the voltage drops to a level sufficient to sustain the discharge at the required current density.

Under certain adverse conditions, however, gas breakdown will not occur in response to an applied voltage, and a discharge will not be initiated. In particular, for a laser tube encapsulated in a protective housing, the tube is in darkness prior to initiation of a discharge therein and is normally at a relatively low temperature, both of these conditions being adverse to gas breakdown. This lowers the reliability with which the laser can be started.

In the past, in order to improve the starting reliability of cold cathode gas lasers, an insulated electrically conductive wire has been provided between the laser tube and the protective housing and extending longitudinally along the laser tube for substantially the length of the tube. One end of the wire was electrically connected to the positive terminal of the laser power supply, with the other end of the wire terminating in a loop extending circumferentially about the laser tube near the adjacent end of the tube. For further details concerning laser starting enhancing arrangements of this type, reference may be made to U.S. Pat. No. 3,792,372, issued Feb. 12, 1974 to John T. Mark. As is further disclosed in this patent, in order to compensate for effects of the capacitance produced by such an external wire, a resistance of a value ranging from 20 megohms to 500 megohms may be inserted in series with the wire.

Although external wire-loop laser starting arrangements of the type described above have achieved some improvement in the starting reliability of cold cathode gas lasers in a dark environment, difficulties are still being experienced. Specifically, different starting voltages are frequently required to start different individual laser tubes built to the same design specifications. Moreover, the time delay between application of the starting voltage and commencement of the discharge also is non-uniform for individual laser tubes.

SUMMARY OF THE INVENTION

It is an object of the present invention to provide an arrangement for starting a cold cathode gas laser with increased starting reliability.

It is a further object of the invention to provide a starting arrangement for a discharge-excited gas laser which achieves more rapid starting with relatively low voltages and with a more uniform voltage magnitude and turn-on time delay for individual laser tubes than has been provided by the prior art.

It is still another object of the invention to provide a packaged cold cathode gas laser of high starting reliability and of minimum size, weight and cost.

In a laser according to the invention a laser gas is contained within a tubular member of electrically insulating material, with a tubular cathode coaxially disposed within the tubular member. An anode is provided at one end of the insulating tubular member, and a voltage is applied between the anode and the cathode.

The arrangement according to the invention for enhancing the commencement of the electrical discharge in the laser gas between the anode and the cathode includes a strip of electrically conductive plastic disposed on the outer lateral surface of the insulating tubular member. The conductive plastic strip has a first portion extending longitudinally along the tubular member for most of the length of the tubular member and has a second portion extending circumferentially along the lateral surface of the tubular member in the vicinity of its end remote from the anode. A tape of a electrically insulating material having a width greater than that of the strip overlies both of the aforementioned portions of the strip and adhesively contacts the strip and portions of the surface of the tubular member on both sides of the strip in a manner holding both strip portions against the tubular member. The end of the longitudinally extending portion of the strip remote from the circumferentially extending portion is electrically connected to the anode of the laser.

Additional objects, advantages and characteristic features of the present invention will become readily apparent from the following detailed description of a preferred embodiment of the invention when considered in conjunction with the accompanying drawing.

BRIEF DESCRIPTION OF THE DRAWING

In the accompanying drawing:

FIG. 1 is a longitudinal view, primarily in section, illustrating a gas laser in accordance with the invention;

FIG. 2 is a cross-sectional view taken along line 2—2 of FIG. 1; and

FIG. 3 is an enlarged fragmentary cross-sectional view of a portion of the laser of FIG. 1 taken along line 3—3.

DESCRIPTION OF A PREFERRED EMBODIMENT

Referring to the drawing with greater particularity, a laser according to the invention may be seen to include an elongated tube 10 of electrically insulating material such as glass and having a relatively larger diameter main body portion 12 extending for most of the length of the tube 10 and a relatively smaller diameter extension portion 14. Coaxially disposed within and extending along a major portion of the length of the main body portion 12 is an elongated discharge tube 16 which is structurally integrated with the tube 10 at the transition region between its portions 12 and 14. The discharge tube 16 defines a capillary bore 18 therethrough.

Bonded to the end of the laser tube extension portion 14 remote from the main body portion 12 is a plate-like member 20 of an electrically conductive material, such as Kovar for example, which can be readily fused or bonded to glass. The member 20 functions as an anode for the laser-exciting discharge and is provided with an aperture (not shown) aligned with the capillary bore 18. Attached to the other side of the anode member 20 is a tubular mirror-supporting member 22 on which a totally reflecting mirror 24 is mounted.

A cold cathode for the laser of FIGS. 1 and 2 is provided in the form of a tubular member 26 of an electrically conductive material such as aluminum coaxially mounted within the main body portion 12 of the tube 10 adjacent to the inner wall thereof. The longitudinal extent of the cathode member 26 is sufficient to provide substantial longitudinal overlap with the discharge tube 16. A metal plug 28, of aluminum for example, may be press-fit into the end of the cathode member 26 remote from the anode member 20 to substantially close the discharge region. The plug 28 defines an aperture 30 aligned with the capillary bore 18.

Electrical connection to the cathode 26 is afforded by means of a spiral-configured conductor 32 disposed between and electrically connected to the plug 28 and a metal plate 34 which is sealed to the end of the main body portion 12 of the tube 10 remote from the extension 14. A tubular mirror-supporting member 36 is disposed in an aperture in end plate 34 and extends outwardly therefrom in alignment with the capillary bore 18. A partially reflecting mirror 38 is mounted at the end of the support member 36 remote from the laser tube 10. A gas-fill and exhaust tube 40 is also provided through end plate 34 in gas communication with the interior of the tube 10 to enable the interior of the tube 10 to first be evacuated and to subsequently be filled with a laser gas (preferably helium-neon) at a desired pressure, after which the end of the tube 40 is sealed as shown at 42.

The aforedescribed assembly is mounted within a protective tubular metal housing 44 of a diameter slightly greater than the outer diameter of the laser tube 10. The tube 10 may be mounted within the housing 44 in shock-resistant fashion by means of support pads 46 of a resilient material such as silicone rubber. The support pads may be formed by applying the pad material in liquid form through appropriately placed holes 48 in the housing 44, after which the pad material is allowed to solidify. The housing 44 may be closed by means of end caps 50 and 52 attached to the respective ends of the housing 44. End cap 52 which is adjacent to the partially transmissive mirror 38 is provided with an aperture 54 aligned with the capillary bore 18 to enable egress of the generated laser beam. An electrical conductor 56 is electrically connected between housing end cap 52 and laser tube end plate 34 to enable the cathode to be maintained at the housing potential, normally ground.

Electrical connection to the anode 20 may be achieved via an electrical conductor 57 and a plurality of ballast resistors 58 connected in series between the anode 20 and a junction terminal 60 located on the outer surface of laser tube 10 adjacent to the inner end of its extension portion 14. An electrical conductor 62 connected to the terminal 60 extends out of the housing 44 for connection to the positive terminal of an appropriate laser power supply (not shown), the negative terminal of which may be connected to the housing 44. As a specific example for illustrative purposes, when the laser gas is helium-neon at a pressure of a few Torr, an appropriate power supply may provide a 6.5 kv starting voltage and, after the discharge has commenced, a steady state anode-cathode voltage of 1350 v at a current of 4.5 ma. An appropriate value of ballast resistance provided by the resistors 58 for the aforementioned operating conditions would be 75,000 ohms.

In accordance with the invention, the starting characteristics of the aforedescribed laser are significantly enhanced by means of a strip 64 of electrically conductive plastic disposed on the outer surface of laser tube main body portion 12. The strip 64 extends parallel to the axis of the tube 10 for substantially the length of the main body portion 12. One end of the strip 64 is electrically connected to the junction terminal 60, while the opposite end portion 66 of the strip 64 is disposed circumferentially about the tube body portion 12 in a single turn near the end of the tube 10 remote from the anode 20.

A specific exemplary electrically conductive plastic which may be employed for the strip 64 may be electrically conductive plastic Type 1074, sold under the trade name "Velostat" by Minnesota Mining and Manufacturing Company, St. Paul, Minnesota, although similar electrically conductive plastics may be employed instead. As a specific example for illustrative purposes, the strip 64 may be 12 inches long, 0.25 inches wide, and 0.004 inches thick. A Velostat strip of these dimensions provides an end-to-end resistance of about one megohm.

The electrically conductive strip 64 including its circumferentially disposed portion 66 may be held in position against the outer surface of laser tube body portion 12 by means of an overlying tape 68 of electrically insulating material having a width greater than that of the strip 64. The tape 68, which may have a backing of Mylar, for example, has an adhesive layer which contacts the strip 64 (including its circumferentially extending portion 66) and portions of the surface of the tube body portion 12 on both sides of the strip 64 in a manner holding the strip 64 against the tube portion 12. As a specific example for illustrative pruposes, when used in conjunction with the aforementioned specific exemplary conductive strip 64, the tape 68 may have a thickness of about 0.003 inch and a width of about 1.0 inch. After the conductive strip 64 and the supporting and insulating tape 68 have been affixed to the laser tube 10, a mass of insulating material such as silicone rubber may be applied over the junction terminal 60 to completely insulate the starting enhancing circuitry.

The aforedescribed arrangement according to FIGS. 1–2 has been found to dramatically improve the starting characteristics of the laser exciting discharge. Specifically, the arrangement has achieved reliable starting with lower and more uniform starting voltages and with considerably shorter and more uniform time delays between power supply activation and discharge commencement than has been obtained with the prior art for a number of individual laser tubes made to the same design specifications. In addition, the aforementioned improved starting is achieved in an arrangement which requires only a minimum amount of radial space (more than six times less than that required for external starting wires of the prior art), thereby lending itself to the provision of a small, compact and inexpensive packaged cold cathode gas laser.

Although the present invention has been shown and described with reference to a particular embodiment, it should be understood that various changes and modifications which are obvious to a person skilled in the art to which the invention pertains are deemed to lie within the spirit, scope and contemplation of the invention.

What is claimed is:

1. In a gas laser comprising a tubular member of electrically insulating material, a laser gas contained within said tubular member, a tubular cathode coaxially disposed within said tubular member, an anode disposed at one end of said tubular member, and means for applying a voltage between said anode and said cathode, the improvement for enhancing the commencement of an electrical discharge in said laser gas between said anode and said cathode comprising:

a strip of electrically conductive plastic disposed on the outer lateral surface of said tubular member and having a first portion extending longitudinally along said tubular member for most of the length of said tubular member and having a second portion extending circumferentially along the lateral surface of said tubular member in the vicinity of the end of said tubular member remote from said anode, a tape of electrically insulating material having a width greater than that of said strip overlying both said first and second portions of said strip and adhesively contacting said strip and portions of the surface of said tubular member on both sides of said strip in a manner holding said first and second portions of said strip against said tubular member, and means for electrically connecting the end of said first portion of said strip remote from said second portion to said anode.

2. The improvement according to claim 1 wherein said second portion of said strip extends circumferentially completely about said tubular member.

3. The improvement according to claim 1 wherein said end of said strip is electrically connected to an electrical junction connection mounted on the outer lateral surface of said tubular member adjacent to said end of said strip and electrically connected to a power supply terminal, and further including at least one ballast resistor electrically connected between said junction connection and said anode.

4. The improvement according to any of claims 1, 2 or 3 wherein said laser gas is helium-neon.

5. The improvement according to claim 4 wherein said strip has a resistance in the vicinity of 1 megohm.

6. The improvement according to claim 4 wherein said strip has a thickness of about 0.004 inch.

7. The improvement according to claim 6 wherein said strip has a width of about 0.25 inch.

* * * * *

UNITED STATES PATENT AND TRADEMARK OFFICE
CERTIFICATE OF CORRECTION

PATENT NO. : 4,190,810
DATED : February 26, 1980
INVENTOR(S) : ALLAN E. BAYLEY

It is certified that error appears in the above—identified patent and that said Letters Patent is hereby corrected as shown below:

Column 4, line 18, "Type 1074" should be --Type 1704--.

Signed and Sealed this

Twenty-fifth Day of November 1980

[SEAL]

Attest:

SIDNEY A. DIAMOND

Attesting Officer

Commissioner of Patents and Trademarks